(12) United States Patent
Yoshio et al.

(10) Patent No.: US 7,245,306 B2
(45) Date of Patent: Jul. 17, 2007

(54) IMAGE PROCESSING METHOD, IMAGE PROCESSING APPARATUS, STORAGE MEDIUM AND PROGRAM

(75) Inventors: Katsuhito Yoshio, Kanagawa (JP); Ayako Kurita, Kanagawa (JP); Takafumi Miyagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 10/633,036

(22) Filed: Aug. 4, 2003

(65) Prior Publication Data

US 2004/0070619 A1 Apr. 15, 2004

(30) Foreign Application Priority Data

Aug. 19, 2002 (JP) ............................. 2002-238103

(51) Int. Cl.
G09G 5/02 (2006.01)
G06K 9/00 (2006.01)
G06F 9/00 (2006.01)
G06F 17/00 (2006.01)
G09G 5/00 (2006.01)

(52) U.S. Cl. ...................... 345/591; 345/593; 345/619; 345/592; 382/162; 382/167; 715/764; 715/838

(58) Field of Classification Search ........ 345/589–591, 345/593–594, 597, 638, 619, 592, 600; 715/763–764, 715/810, 835, 838, 854–855; 382/162–167, 382/232, 224

See application file for complete search history.

(56) References Cited

U.S. PATENT DOCUMENTS

| 5,953,008 | A | * | 9/1999 | Hagiuda ..................... 345/630 |
| 6,031,543 | A | * | 2/2000 | Miyashita et al. .......... 345/593 |
| 6,237,010 | B1 | * | 5/2001 | Hui et al. .................... 715/502 |
| 6,333,752 | B1 | * | 12/2001 | Hasegawa et al. .......... 715/764 |
| 6,437,797 | B1 | * | 8/2002 | Ota ............................ 345/638 |
| 6,701,011 | B1 | * | 3/2004 | Nakajima .................... 382/167 |
| 6,734,869 | B2 | * | 5/2004 | Murashita et al. .......... 345/589 |
| 2002/0118210 | A1 | * | 8/2002 | Yuasa et al. ................ 345/589 |
| 2002/0135621 | A1 | * | 9/2002 | Angiulo et al. ............. 345/838 |
| 2003/0184815 | A1 | * | 10/2003 | Shiki et al. ................. 358/453 |
| 2004/0001107 | A1 | * | 1/2004 | Russon ....................... 345/838 |
| 2004/0042634 | A1 | * | 3/2004 | Cazier ........................ 382/100 |

FOREIGN PATENT DOCUMENTS

| EP | 0 895 196 A1 | 2/1999 |
| JP | 10-210306 A | 8/1998 |
| JP | 11-32227 A | 2/1999 |
| JP | 11-136528 | 5/1999 |
| JP | 11-196285 A | 7/1999 |

* cited by examiner

Primary Examiner—Wesner Sajous
(74) Attorney, Agent, or Firm—Fitzpatrick, Cella, Harper & Scinto (57) ABSTRACT

An image processing parameter is determined by moving an image displayed on a map representing a color space to an arbitrary position on the map, and an image process corresponding to the arbitrary position is performed on the image at the position after the movement. The map representing the color space is displayed, and an image processing parameter is determined by relatively moving on the map an image in regard to the map. By virtue of these features, operability and sensuous usability in color adjustment are improved.

10 Claims, 8 Drawing Sheets

IMAGE PROCESSING METHOD, IMAGE PROCESSING APPARATUS, STORAGE MEDIUM AND PROGRAM

BACKGROUND OF THE INVENTION

1. Field of the Invention

The present invention relates to an image processing method by which operability and sensuous usability in color adjustment are improved, an image processing apparatus to which the image processing method is applied, a program which is used to execute the image processing method, and a storage medium which stores the program.

2. Related Background Art

Figure 8:
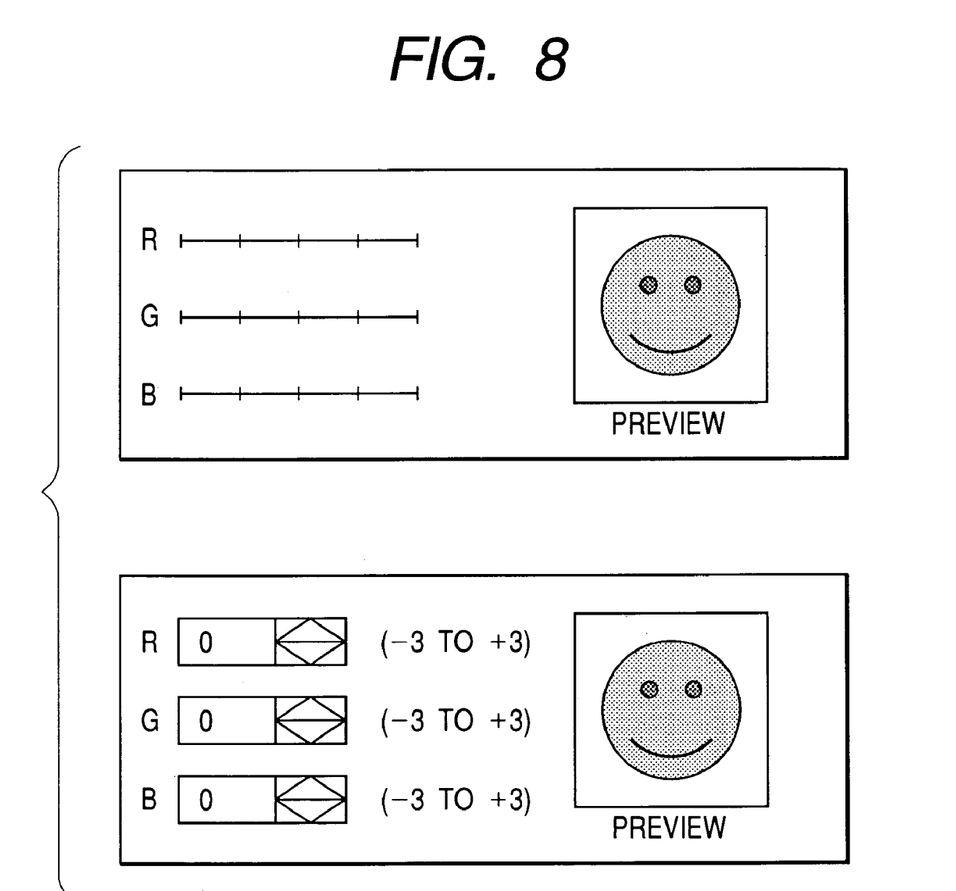
FIG. 8 is a diagram showing a conventional controller to be used in image adjustment.

Conventionally, in a color image process, image adjustment is performed in regard to each of R (red), G (green) and B (blue) components by using a controller such as sliders, spin boxes or the like, as shown in FIG. 8.

However, in such a conventional method, a user has to infer a color adjustment result from parameter values set in regard to each of the R, G and B components, whereby it is difficult for the user to perform a sensuous operation. Incidentally, as shown in FIG. 8, there is a method of accessorily displaying a preview image, in which the parameter values of the R, G and B components have been reflected, together with the controller for adjusting the R, G and B components. However, even in this method, the user has to compare the setting of the controllers with a change of the preview image displayed in parallel with the controllers with his eyes to perform the color adjustment, whereby there is room for improvement in the point of usability or user-friendliness.

SUMMARY OF THE INVENTION

The present invention has been made to solve such a conventional problem, and is characterized by following essential elements.

That is, the present invention is characterized by determining an image processing parameter by moving an image displayed on a map representing a color space to an arbitrary position on the map, and performing an image process, corresponding to the arbitrary position, to the image at the position after the movement.

Moreover, the present invention is characterized by displaying a map representing a color space, and determining an image processing parameter by relatively moving on the map an image in regard to the map.

Other object and features of the present invention will be apparent from the following description in conjunction with the accompanying drawings.

DETAILED DESCRIPTION OF THE PREFERRED EMBODIMENTS

First Embodiment

Hereinafter, one embodiment of the present invention will be described in detail with reference to the attached drawings. Incidentally, although a color printer is used by way of example in the following embodiments, it is needless to say that the present invention is also applicable to a monochrome printer. Moreover, any of an electrophotographic recording method, an inkjet recording method and a thermal transfer recording method are applicable as a recording method. Moreover, although a binarization process is used by way of example in the following embodiments, it is needless to say that the present invention is also applicable to a multivalued printer which adopts other conversion process such as a process of generating four-valued data, a process of generating eight-valued data, or the like.

An image processing apparatus according to the present embodiment first analyzes image data such as command-type image data for output control transferred from an application (program), expands the input image data into output image data according to the analyzed result, performs an image process to the image data when the image data is expanded, and then displays and prints the processed image data.

More specifically, the image data input from the application is first analyzed, and the analyzed image data is converted into image data representing a thumbnail image. Alternately, a thumbnail image acting as a sample image for setting a color processing parameter has been previously provided. Then, a later-described instruction is issued in regard to the thumbnail image, the color processing parameter is changed in response to the instruction, the expanded image data is processed by using the changed color processing parameter, and the image represented by the processed image data is then displayed as a preview image on an external display apparatus.

When the displayed image is printed, the former (original) image data is expanded by using the finally set color processing parameter, and the expanded image data is then output to an external print apparatus.

Incidentally, as a method of setting the color processing parameter, there are a method of performing to an image a color process corresponding to an arbitrary position on a color space map as described later, a method of freely moving the image itself on the color space map in response to a user's instruction, and a method of moving the image on the color space map fixedly in an arbitrary direction. Therefore, it is easy for a user to sensuously see and select color adjustment to obtain a desired color, whereby it is possible to select an effective and optimum operation according to a user's preference and a use situation.

Hereinafter, the present embodiment will be explained in detail.

Figure 1:
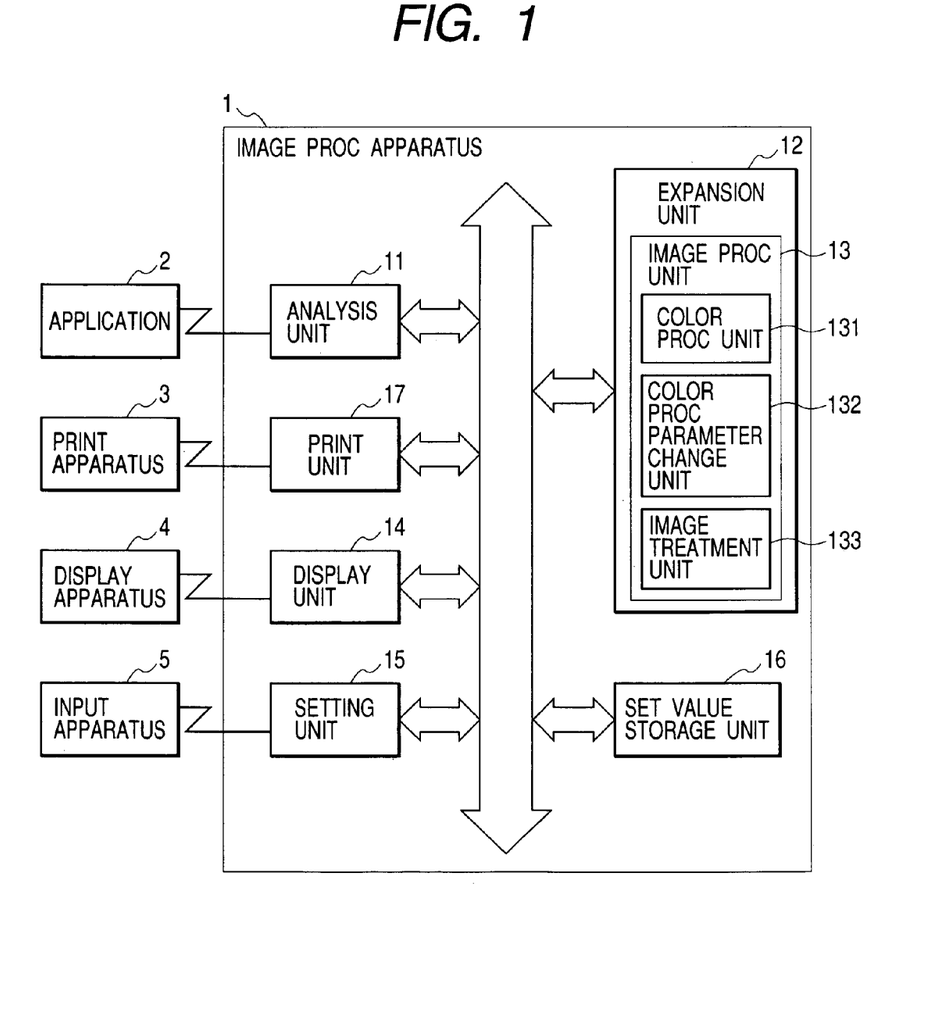
FIG. 1 is a block diagram showing a structural example of an image processing apparatus according to the embodiment.

FIG. 1 is a block diagram showing the structure of the image processing apparatus according to the embodiment of the present invention.

In FIG. 1, numeral 1 denotes the image processing apparatus, numeral 2 denotes an application (program) by which a user performs a drawing process of image data, numeral 3 denotes a print apparatus which forms a print image based on output data from the image processing apparatus 1, numeral 4 denotes a display apparatus which forms a display image based on the output data from the image processing apparatus 1, and numeral 5 denotes an input apparatus which is used to externally perform various settings.

Numeral 11 denotes an analysis unit which analyzes image data transferred from the application 2. Here, for example, such an analysis process includes a process to convert image data of an image description format specific in the application into image data suitable to be processed in the image processing apparatus. Numeral 12 denotes an expansion unit which includes an expansion unit for performing various processes to the image data according to the analysis by the analysis unit 11 and converting the processed data into output data to be used in an output operation of a later-described output unit. Numeral 13 denotes an image processing unit which is included in the expansion unit 12. The image processing unit 13 particularly processes the image data. Numerals 131, 132 and 133 respectively denote a color processing unit, a color processing parameter change unit and an image treatment unit which are all included in the image processing unit 13. The color processing unit 131 acts as a color processing means for performing particularly the above color process, the color processing parameter change unit 132 changes a parameter to be used when the color processing unit 131 performs the color process, and the image treatment unit 133 performs image treatments such as image reduction, image enlargement, image duplication and the like to the image data transferred from the analysis unit 11.

Numeral 14 denotes a display unit which performs a process to cause the external display apparatus to display the treated image data and various setting screens, and numeral 15 denotes a setting unit on which the user of the image processing apparatus 1 performs a setting process by using the external input apparatus such as a mouse or a keyboard as usage. In the present embodiment, an adjustment screen and an output mode setting screen are graphically displayed respectively by the display unit 14 and the setting unit 15, so that the user can perform the setting. The details of the setting will be later described in detail with reference to FIGS. 3 and 4. Numeral 16 denotes a set value storage unit which stores a set value obtained by the setting unit 15, and numeral 17 denotes a print unit which performs a process to output the output image data expanded by the expansion unit 12 to the external print apparatus 3.

Incidentally, it should be noted that the above units are controlled as a whole by a not-shown CPU on the basis of a program stored in a not-shown storage means.

In the present embodiment, the print apparatus 3 is a color laser beam printer or a color inkjet printer, the image data to be output is bitmap data of one page, and the image data is prepared in regard to each of four colors of C (cyan), M (magenta), Y (yellow) and K (black). The print unit 17 sends the image data to the print apparatus 3, and the print apparatus 3 forms an image on a recording medium by using C, M, Y and K inks in response to the sent image data. Here, it is needless to say that coloring materials to be used in the print operation are not limited to the C, M, Y and K inks. That is, in addition to the C, M, Y and K inks, inks of Lc (light cyan), Lm (light magenta), O (orange), G (green) and the like may be used as the coloring materials.

Figure 2:
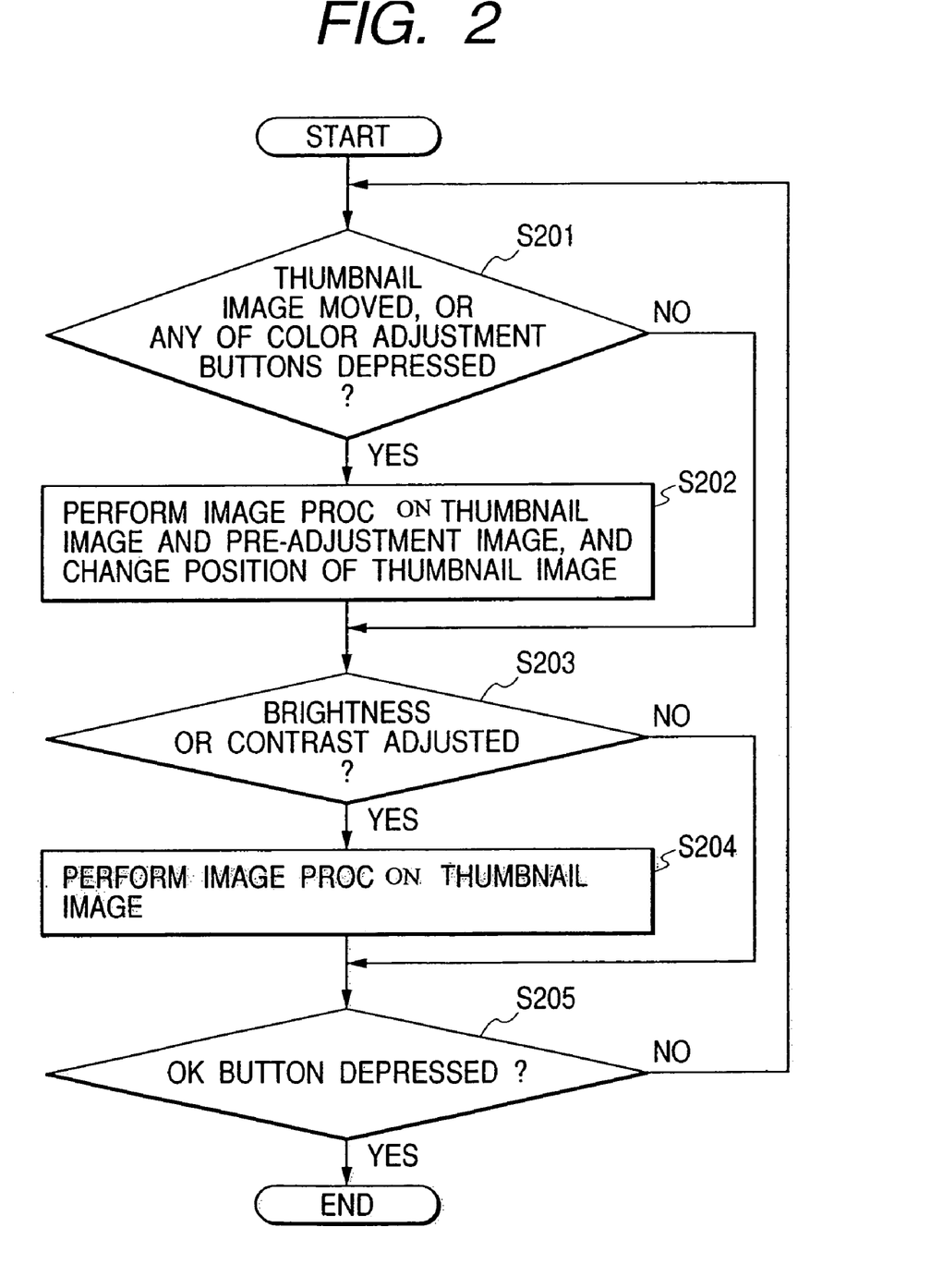
FIG. 2 is a flow chart showing a setting procedure according to the embodiment.
Figure 3:
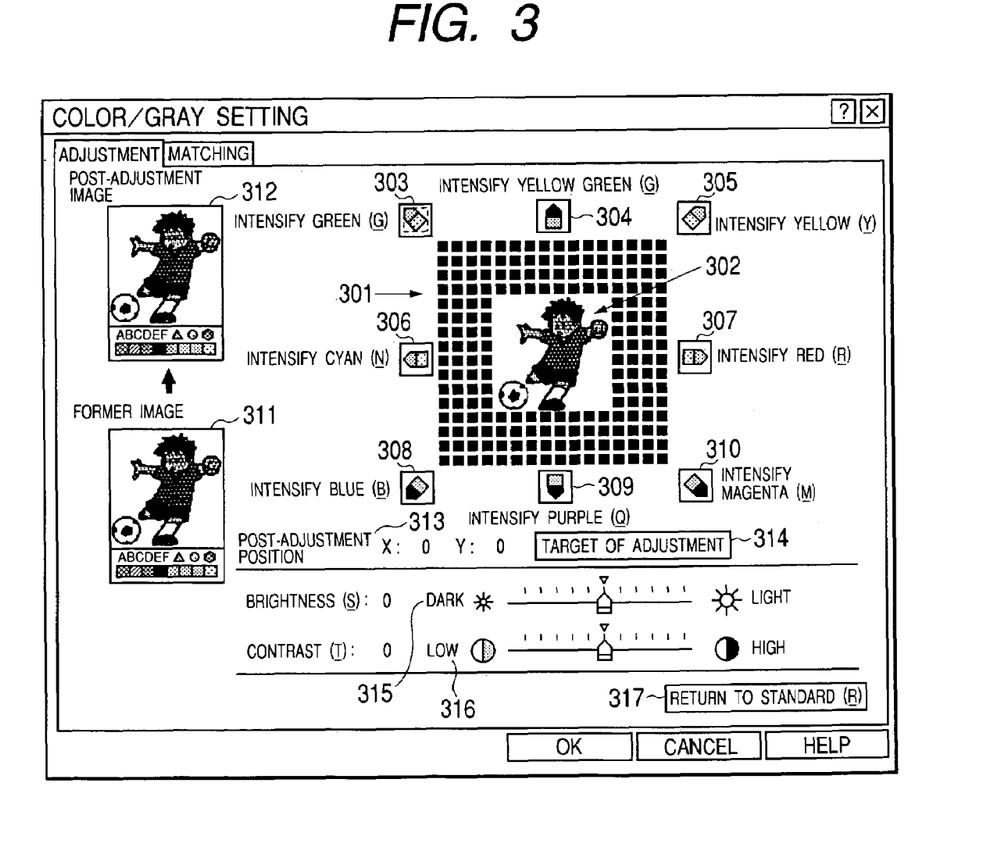
FIG. 3 is a diagram for explaining one example of an image adjustment setting section according to the present invention.

FIGS. 2 and 3 show a flow of procedure in a case where, in the image processing unit 13, an image color signal is input from the analysis unit 11, the input color signal is processed, and the processed signal is then output as an output color signal to the display unit 14 or the print unit 15. In a step S201, it is observed whether or not a thumbnail image 302 is moved or any one of color adjustment buttons 303 to 310 is depressed. If it is observed that the thumbnail image 302 is moved or any one of the color adjustment buttons 303 to 310 is depressed, then in a step S202 an image process according to the result of the step S201 is performed to the thumbnail image 302 and a pre-adjustment image 311 (i.e., an image to which adjustment is not yet performed), and the position of the thumbnail image on a color space map 301 is changed. Here, it should be noted that the pre-adjustment image is also called a former image as shown in, e.g., FIG. 3. Of course, a post-adjustment position 313 (i.e., a position of the image to which the adjustment has been performed) is changed in this case. Then, in a step S203, it is observed whether or not brightness 315 and/or contrast 316 are adjusted. If it is observed that the brightness 315 and/or contrast 316 are adjusted, then in a step S204 the adjusted brightness and/or contrast are reflected in the thumbnail image 302 through the image process. Here, it should be noted that the observations in the steps S201 and S203 are always performed. Then, when an "OK" button shown in FIG. 3 is depressed in a step S205, it is judged that the adjustment ends. It should be noted that the procedure shown in the flow chart of FIG. 2 is achieved by executing software programs (printer driver, application software, etc.) with a not-shown CPU provided in the image processing apparatus 1.

Hereinafter, the process shown in FIG. 2 will be explained in detail. First, the information stored in the set value storage unit 16 is referred. Here, it should be noted that the information accords to the setting by the user.

Next, a setting process of the set value to the set value storage unit 16 will be explained hereinafter with reference to FIG. 3 showing the adjustment screen graphically displayed on the external display apparatus 4 through the display unit 14. In FIG. 3, numeral 301 denotes the color adjustment area for sensuously showing how the in-adjustment thumbnail image 302 is actually adjusted during the color adjustment process, and the color adjustment area is hereinafter called the color space map as a matter of convenience. The color space map 301 is colored so that the center thereof is achromatic (black or white) and chroma rises in proportion as getting away from the center. The portion in the vicinity of the color adjustment button 303 is colored by green, the portion in the vicinity of the color adjustment button 304 is colored by yellow green, and yellow becomes intense as it approaches the button 304 from the button 303. Incidentally, when the color adjustment buttons 303, 304, 305, 307, 310, 309, 308, 306 and 303 are sequentially depressed in due order, the color space map 301 is sequentially colored by green, green yellow (or yellow green), yellow, red, magenta, blue magenta (or purple), blue, cyan and green in due order so that these colors gradually change. The one thumbnail image 302 is disposed on the color space map 301, and the eight color adjustment buttons 303 to 310 are disposed on the periphery of the color space map 301.

When the user freely disposes the thumbnail image 302 on the grids of the color space map 301 through the input apparatus 5 such as the mouse, the keyboard or the like, the information determined based on the relative position of the thumbnail image 302 on the color space map 301 at that time can be set as a color processing parameter. That is, the color space map 301 functions as an indicator to indicate the area which can be adjusted, and also functions to indicate the range in which the thumbnail image 302 can be moved. On the color space map 301, the thumbnail image 302 itself can be dragged and moved by using a pointing device (input apparatus 5) such as a mouse or the like, and the thumbnail image 302 itself can be also moved in a moment of time to the position on the color space map 301 where the pointing device such as the mouse or the like is clicked. When the thumbnail image 302 reaches the edge of the color space map 301, the color adjustment in that direction cannot be performed any more. Accordingly, it can be understood that the color space map 301 functions as the indicator to indicate the area which can be adjusted.

Moreover, the latest color adjustment result is reflected on the thumbnail image 302 itself, whereby a current color adjustment state can be confirmed from the color of the thumbnail image 302 itself in addition to the position information of the thumbnail image 302 on the color space map 301.

The eight color adjustment buttons (symbols) which are disposed on the periphery of the color space map 301 are respectively called the green button 303, the green yellow (or yellow green) button 304, the yellow button 305, the cyan button 306, the red button 307, the blue button 308, the purple (or blue magenta) button 309, and the magenta button 310. When each of the buttons 303 to 310 is depressed, a color parameter of the color corresponding to the depressed button can be increased, and also the thumbnail image 302 is moved on the color space map 301 so as to approach the position of the corresponding button depressed. Incidentally, although the eight colors are used in the present embodiment, chromatic colors other than these colors are also applicable to the present invention.

For example, when the user wishes an image in which green has been intensified, he can obtain such an image by selectively using any one of three methods. That is, in the first method, the user drags and moves the thumbnail image 302 to the upper left portion of the color space map 301 by using the input apparatus 5 acting as the pointing device represented by the mouse (external apparatus) through the setting unit 15. In the second method, the user clicks the upper left area on the color space map 301. Moreover, in the third method, the user directly depresses the green button 303. In this case, at the same time when the green button 303 is depressed, the thumbnail image 302 is moved upward by one grid and leftward by one grid on the color space map 301. Then, in proportion to the movement of the thumbnail image 302, this image changes into a state that green has been emphasized. That is, by repeating such an operation, the color of the thumbnail image 302 is set to a desired color.

When the above third method is selected in consideration of the name "green" of the button 303 itself, it is possible to more finely and certainly intensify green as compared with the case where the above first or second method is selected.

The features of the two methods, one of performing the color adjustment by directly changing the position of the color-processed image on the color space map, and the other of performing the color adjustment by selectively using the eight (i.e., red, blue, yellow, green cyan, magenta, yellow green, purple) buttons disposed on the periphery of the color space map, are as follows. That is, the former method is effective in a case where the user performs inference from the color on the color space map and/or the position of the color-processed thumbnail image 302 and then intends to bring the current color sensuously close to the inferred color. On one hand, the latter method is effective in a case where the user performs inference from each color name of the color adjustment button and thus instructs through the color adjustment button in question to move the thumbnail image 305 by each grid so as to more accurately and finely select the desired color (i.e., fine color adjustment). Therefore, after the color adjustment is roughly performed to the thumbnail image 305 according to the former method, when the fine adjustment is performed accurately to color tone of the thumbnail image according to the latter method, the effective color adjustment can be achieved as a whole.

Incidentally, the former image (or pre-adjustment image) 311 represents an original image to which the color adjustment is not yet performed, and a post-adjustment image 312 represents an image which has been processed by using the color adjustment parameter same as that for the thumbnail image 302. The user can easily recognize degree of change due to the adjustment by comparing the pre-adjustment image 311 with the post-adjustment image 312, whereby more certain color adjustment can be achieved.

The post-adjustment position 313 represents position-information of the thumbnail image 302 on the color space map 301. The post-adjustment position 313 has values within a range of −5 to 0 to +5 in regard to each of X and Y axes, and its center value (0, 0) corresponds to an unadjusted state. Thus, the user can perform more certain color adjustment on the basis of such coordinate information. Moreover, if the user keeps the obtained coordinate information in his memory, he can easily bring back the previously set value when again performing the same color adjustment to the same (or other) image. Incidentally, although the position information has the value within the range of −5 to 0 to +5 in the present embodiment, it is needless to say that other values are also applicable to the present invention.

Figure 4:
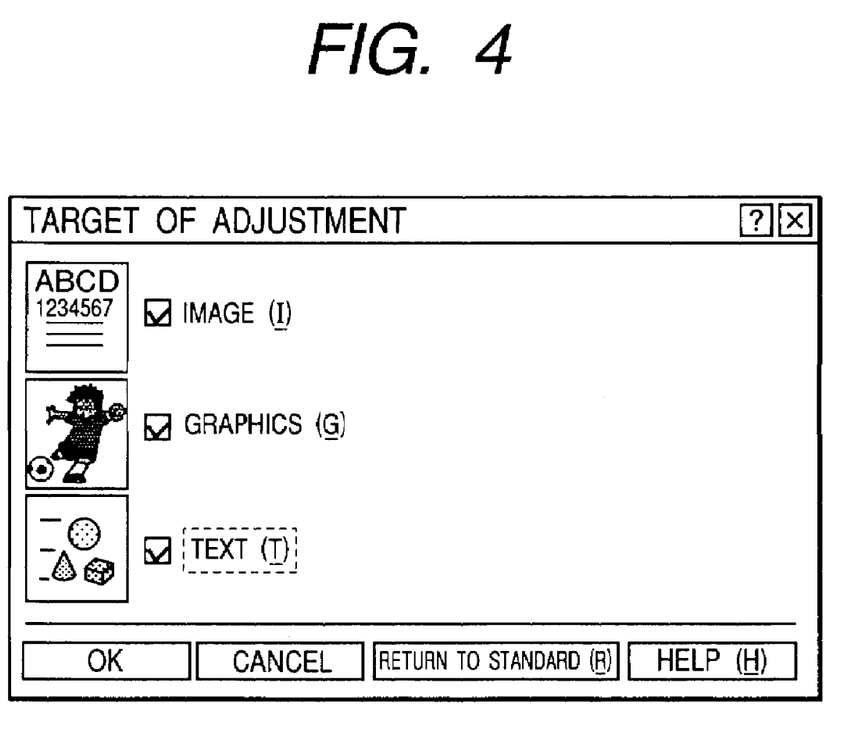
FIG. 4 is a diagram for explaining one example of an adjustment target setting section according to the present invention.

When a target of adjustment button (or adjustment target button) 314 is depressed, an adjustment target dialog box shown in FIG. 4 is displayed. Then, by handling check boxes disposed on the adjustment target dialog box, the adjustment for hue of FIG. 3, later-described brightness and later-described contrast can be set in regard to each of objects such as photographs, graphics, characters and the like constituting a process-target image.

The brightness slider 315 is used to adjust the brightness in regard to each of the thumbnail image 302 and the post-adjustment image 312, the contrast slider 316 is used to adjust the contrast in regard to each of the thumbnail image 302 and the post-adjustment image 312, and each of the brightness slider 315 and the contrast slider 316 has the scale within a range of −5 to 0 to +5 in the present embodiment. That is, as above, the brightness slider 315 and the contrast slider 316 can be set and handled on the same screen as that on which the hue (color) adjustment is performed, whereby the color adjustment can be performed in arbitrary order. For example, the brightness can be changed while the color adjustment is being performed, and the color adjustment is changed after the contrast is changed. Therefore, the color processing parameters which stand on the color adjustment, the brightness adjustment and the contrast adjustment can be determined, and the image data can be expanded and output to the external print apparatus by using the determined color processing parameters.

Therefore, the result in which the relation between the color adjustment and the contrast has been more sensuously discriminated can be promptly reflected in the image adjustment.

As well as the above post-adjustment position 313, each of the range of the brightness and the range of the contrast is set to have values within a range of −5 to 0 to +5 in the present embodiment, but other values are of course applicable to the present invention. Moreover, it is needless to say that also a case where a controller concerning, in addition to the brightness and the contrast, other image process such as vividness or the like is disposed is applicable to the present invention. Besides, the brightness and the contrast need not necessarily be adjusted at the same time. That is, only one of the brightness and the contrast may be adjusted.

Numeral 317 denotes a return to standard button (simply called a return button hereinafter) which is used to return the color adjustment, the brightness set value and the contrast set value which have been already set by the user to the standard (i.e., default) state. When the return button 317 is depressed, the thumbnail image 302 is moved to the center of the color space map 301, and the color processes are returned to their default states respectively. Moreover, when the return button 317 is depressed, it is possible to set that all the set values are returned to their default states respectively.

Here, it should be noted that the process target image may be treated to generate the thumbnail image. On one hand, it should be noted that a sample image prepared in advance for adjusting the color, the brightness and the contrast may be used as the thumbnail image.

Since the thumbnail image 302 is the same as the post-adjustment image 312, an image adjustment setting section may be set only by displaying the color space map 301, the thumbnail image 302, the color adjustment buttons 303 to 310, the post-adjustment position (indicator) 313, the adjustment target button 314, the brightness slider 315 and the contrast slider 316 shown in FIG. 3, without displaying the post-adjustment image 312 and the former image 311. Therefore, because the post-adjustment image 312 and the former image 311 are not displayed in this case, the color space map 301, the thumbnail image 302, the color adjustment buttons 303 to 310, the post-adjustment position (indicator) 313, the adjustment target button 314, the brightness slider 315 and the contrast slider 316 can be thus displayed with large. As a result, when an instruction section (not shown) for providing a function to cancel the display of the post-adjustment image 312 and the former image 311 and instead to enlarge the display of the color space map 301, the thumbnail image 302, the color adjustment buttons 303 to 310, the post-adjustment position (indicator) 313, the adjustment target button 314, the brightness slider 315 and the contrast slider 316 is disposed on the image adjustment setting section, it is possible to provide the image adjustment setting section which can be easily watched and handled by aged users.

Second Embodiment

Figure 5:
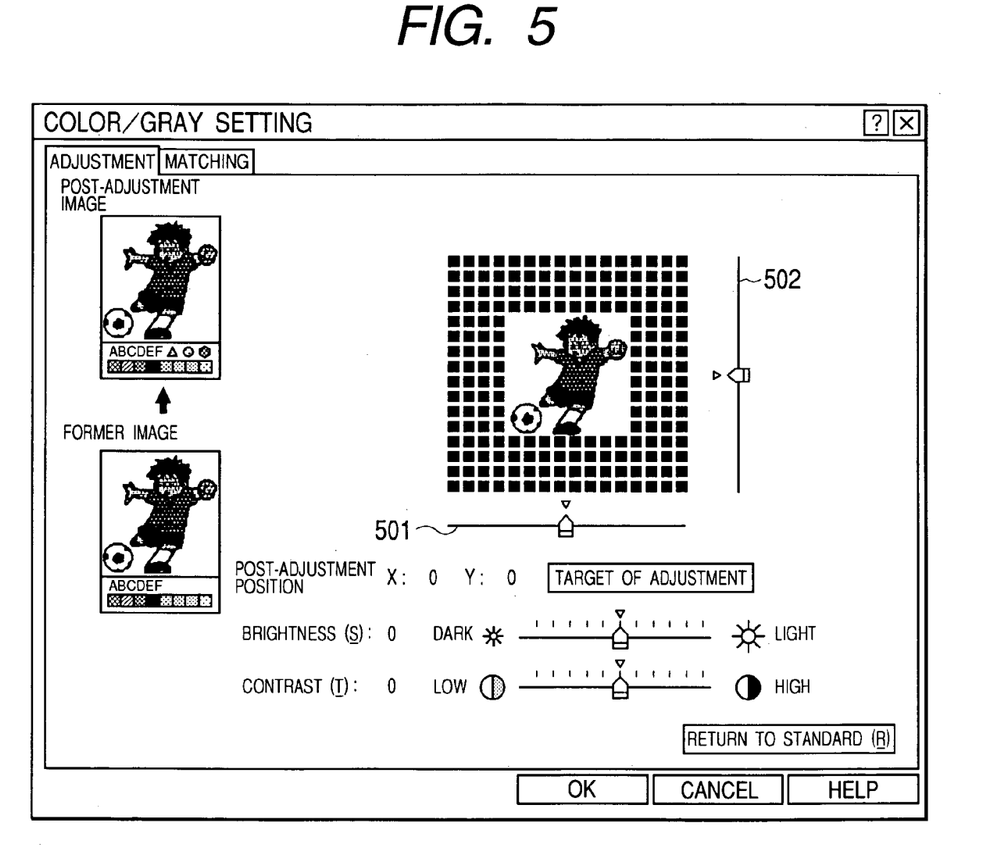
FIG. 5 is a diagram for explaining one example of the image adjustment setting section according to the present invention.
Figure 6:
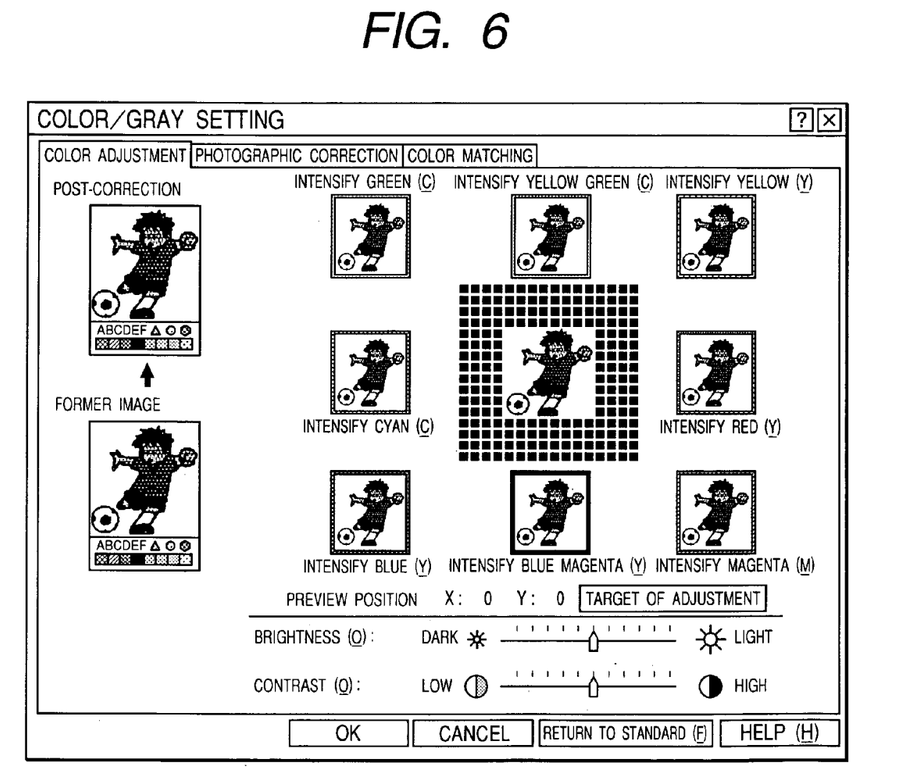
FIG. 6 is a diagram for explaining one example of the image adjustment setting section according to the present invention.
Figure 7:
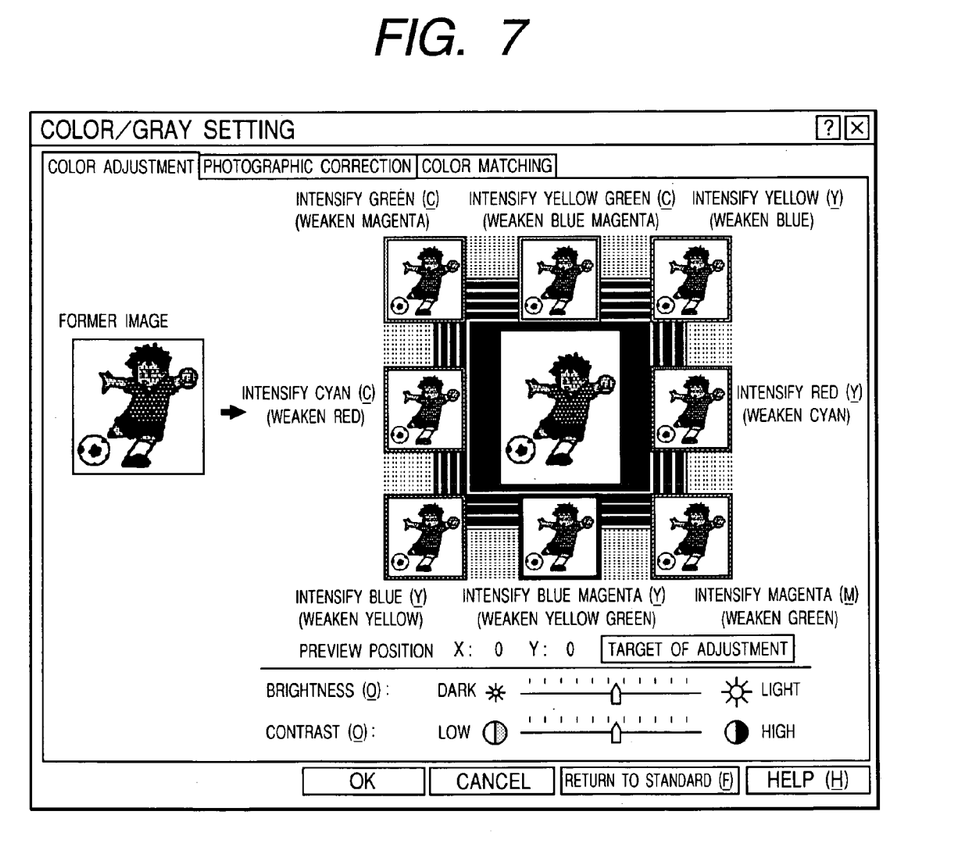
FIG. 7 is a diagram for explaining one example of the image adjustment setting section according to the present invention.

FIGS. 5, 6 and 7 respectively show modifications of the first embodiment which has been explained with reference to FIG. 3.

More specifically, FIG. 5 shows an image adjustment setting section which can be provided by substituting sliders 501 and 502 for the eight color adjustment buttons 303 to 310 disposed on the periphery of the color space map 301 shown in FIG. 3. Like this, even in a case where the sliders are used instead of the color adjustment buttons, it is possible by providing plural handling (or operation) methods to display the thumbnail image on the color space map and thus change the position and color relations between the thumbnail image and the color space map in response to a user's instruction. Moreover, in a case where the image process corresponding to the position and color relations between the thumbnail image and the color space map is performed to the thumbnail image or the color space map, it is possible to more sensuously transfer the currently set situation to the user on the basis of the position information and the image processing information. Therefore, the user can perform direct handling (or operation) when he performs the color adjustment, whereby it is possible to quickly obtain the desired color. Moreover, as well as the first embodiment, the plural methods of changing the position and color relations between the thumbnail image and the color space map are provided and the user selects an optimum operation (i.e., method) to obtain the desired color, whereby it is apparently possible to achieve an effective and easy operation according to a user's preference and a use situation. Here, it should be noted that the plural methods may include a method of performing the color adjustment by using the sliders, a method of moving the thumbnail image by clicking an area on the color space map, and a method of performing the color adjustment by using the color adjustment buttons.

Moreover, FIG. 6 shows an image adjustment setting section which can be provided by substituting image buttons respectively equivalent to the thumbnail image for the eight color adjustment buttons (symbols) 303 to 310 disposed on the periphery of the color space map 301 shown in FIG. 3. By such an arrangement, in regard to the thumbnail image 301 on the color space map 302, the changed result of the thumbnail image to be inherently displayed on the color space map after each of the eight color adjustment buttons was depressed only once can be confirmed or viewed by corresponding each of the eight color adjustment buttons themselves, whereby it is possible to achieve a more sensuous image adjustment operation for the user. Of course, when any one of the color adjustment buttons 303 to 310 (i.e., image buttons in this case) is clicked, the thumbnail image subjected to the color correction according to such a click is displayed on the color space map 302. Then, each of the color adjustment buttons (image buttons) 303 to 310 is updated (changed) to have the color corresponding to a color which would be resultingly obtained if the image adjustment according to the click is performed to the displayed thumbnail image. In other words, the colors of the image buttons are updated in parallel with the update of the thumbnail image on the color space map.

Moreover, FIG. 7 shows the relation between the thumbnail image and the color space map in different expression. That is, FIG. 3 shows that the relation between the color space map and the thumbnail image is displayed by moving and processing the thumbnail image 302 on the color space map 301. On one hand, in FIG. 7, the thumbnail image is only subjected to the image process, and instead the color space map is moved to represent a color adjustment state of the thumbnail image. Thus, the currently set color adjustment state can be represented by the position relation between the color space map and the thumbnail image. Incidentally, it is needless to say that, in order to notify the user of the position relation between the color space map and the thumbnail image, the position relation between the color space map and the thumbnail image may be notified to the user not only by changing either the position of the color space map or the position of the thumbnail image but also by changing both the positions of the color space map and the thumbnail image.

By the constitutions according to the above first and second embodiments, following three effects (1) to (3) can be obtained. That is, according to the effect (1), by displaying the thumbnail image on the map representing the color space (i.e., color space map), it is possible to change the position and color relations between the thumbnail image and the color space map in response to the user's instruction. Moreover, by performing the image process corresponding to the position and color relations between the thumbnail image and the color space map to the thumbnail image or the color space map, it is possible to more sensuously transfer the currently set situation to the user on the basis of the position information and the image processing information. Thus, the user can perform the direct handling (or operation) in regard to the color adjustment, whereby the desired color can be quickly obtained. Besides, according to the effect (2), when the plural methods of changing the position and color relations between the thumbnail image and the color space map are provided (including the method of moving the thumbnail image by dragging it, the method of moving the thumbnail image by using the sliders, the method of moving the thumbnail image by clicking the area on the color space map, and the method of performing the color adjustment by using the color adjustment buttons) and the user selects the optimum operation to obtain the desired color, it is apparently possible to achieve the effective and easy operation according to the user's preference and the use situation. Besides, according to the effect (3), in addition to the color adjustment, it is possible to reflect other image processing parameters such as the brightness, the contrast and the like on the relation between the processed image and the color space map, whereby the user can perform the setting as intensively confirming the image processes in all aspects.

Other Embodiments

Besides, it is needless to say that the object of the present invention can be achieved in a case where a storage medium (or recording medium) storing the program codes of software to realize the functions of the above embodiments is supplied to a system or an apparatus and then a computer (or CPU or MPU) in the system or the apparatus reads and executes the program codes stored in the storage medium. In this case, the program codes themselves read from the storage medium realize the functions of the above embodiments, and the program codes can be written in various storage media such as a CD, an MD, a memory card, an MO and the like.

Moreover, it is needless to say that the present invention also includes not only a case where the functions of the above embodiments are realized by executing the program codes read by the computer, but also a case where an OS (operating system) or the like functioning on the computer executes a part or all of the actual process according to the instructions of the program codes, and the functions of the above embodiments are achieved by that process.

Moreover, it is needless to say that the present invention includes a case where the program codes read from the storage medium are once written in a memory provided in a function expansion card inserted in the computer or a function expansion unit connected to the computer, and then a CPU or the like provided in the function expansion card or the function expansion unit executes a part or all of the actual process according to the instructions of the program codes, and the functions of the above embodiments are achieved by that process.

As explained above, by the above constitutions, it is possible to achieve the operation which is more sensuous and easy for the user.

Moreover, the differences in the results of the plural image processes can be visually recognized, it is possible for the user to more easily set the desired image process.

As many apparently widely different embodiments of the present invention can be made without departing from the spirit and scope thereof, it is to be understood that the present invention is not limited to the specific embodiments thereof expect as defined in the appended claims.

What is claimed is:

1. An image processing method which performs a color process on an image by using a color processing parameter determined based on a position on a map representing a color space, said method comprising the steps of:
   indicating an arbitrary position on the map representing the color space; and
   determining the color processing parameter by moving a thumbnail image displayed on the map representing the color space to the indicated arbitrary position on the map,
   wherein the color process corresponding to the arbitrary position on the map representing the color space is reflected in the thumbnail image which was moved.

2. An image processing method according to claim 1, wherein the movement of the image is further performed by a drag of the thumbnail image or an indication of a symbol that is adjacent to the map.

3. An image processing method according to claim 2, wherein the color processing parameter is finely adjusted by indicating the symbol.

4. An image processing method according to claim 1, further comprising the step of adjusting at least either brightness or contrast of the image,
   wherein the color processing parameter includes adjusted results of the brightness and/or the contrast of the image, as the case may be.

5. An image processing method according to claim 2, wherein the symbol includes a button or a thumbnail image.

6. An image processing method according to claim 1, wherein the map represents a range in which color adjustment can be performed, and the position of the thumbnail image represents a state of the color adjustment.

7. An image processing method according to claim 1, wherein the map is moved to move the image.

8. An image processing apparatus which performs a color process on an image by using a color processing parameter determined based on a position on a map representing a color space, said apparatus comprising:
   indication means for indicating an arbitrary position on the map representing the color space;
   determination means for determining the color processing parameter by moving a thumbnail image displayed on a map representing a color space to an arbitrary position on the map,
   wherein the color process corresponding to the arbitrary position on the map representing the color space is reflected in the thumbnail image which was moved.

9. A storage medium which stores a program which performs a color process on an image by using a color processing parameter determined based on a position on a map representing a color space, said program comprising:
- a code for indicating an arbitrary position on the map representing the color space;
- a code for determining the color processing parameter by moving a thumbnail image displayed on a map representing a color space to an arbitrary position on the map,
- wherein the color process corresponding to the arbitrary position on the map representing the color space is reflected in the thumbnail image which was moved.

10. A physically embodied program in computer-executable form, which performs a color process on an image by using a color processing parameter determined based on a position on a map representing a color space, said program comprising:
- a code for indicating an arbitrary position on the map representing the color space;
- a code for determining an image processing parameter by moving a thumbnail image displayed on a map representing a color space to an arbitrary position on the map,
- wherein the color process corresponding to the arbitrary position on the map representing the color space is reflected in the thumbnail image which was moved.

* * * * *

UNITED STATES PATENT AND TRADEMARK OFFICE
CERTIFICATE OF CORRECTION

PATENT NO. : 7,245,306 B2
APPLICATION NO. : 10/633036
DATED : July 17, 2007
INVENTOR(S) : Katsuhito Yoshio et al.

It is certified that error appears in the above-identified patent and that said Letters Patent is hereby corrected as shown below:

COLUMN 1

Line 21, "whereby" should read --and as a result--;
Line 22, "operation." should read --operation (this term is used herein as a convenient way to denote a color control operation in which the user sees the resulting color as the control is performed, so as to be able to control the color accurately to obtain the desired appearance).--;
Line 30, "whereby" should read --and thus--;
Line 37, "such a" should read --this--;
Line 38, should read --conventional problem.--;
Line 39, should be deleted;
Line 40, should read --According to the present invention,--;
Line 41, should read --an image processing parameter is determined by moving an image, preferably a thumbnail image,--;
Line 44, "to" (second occurrence) should read --on--;
Line 45, "movement." should read --movement. Preferably, the processed image is displayed at the position to which the image has been moved.--.
Line 46, should read --In another aspect of the present invention,--;
Line 47, should read --a map representing a color space is displayed, and--;
Line 48, "by" should read --is determined by--; and
Line 50, "object" should read --objects--.

COLUMN 2

Line 23, "any of an" should be deleted;
Line 24, should read --recording inkjet recording and a thermal--;
Line 25, should read --transfer recording are recording;
Line 26, "method." should read --methods to which the present invention can be applied.--
Line 29, "other" should read --another--;
Line 37, "to" should read --on--;
Line 58, "to" should read --on--;
Line 60, "later," should read --below,--;
Line 64, "to sensuously" should read --sensuously to--;
Line 65, "whereby" should read --and thus--;
Line 66, "a" should read --the--; and
Line 67, "a" should read --the--.

UNITED STATES PATENT AND TRADEMARK OFFICE
CERTIFICATE OF CORRECTION

PATENT NO. : 7,245,306 B2
APPLICATION NO. : 10/633036
DATED : July 17, 2007
INVENTOR(S) : Katsuhito Yoshio et al.

It is certified that error appears in the above-identified patent and that said Letters Patent is hereby corrected as shown below:

COLUMN 3

Line 8, "of" should read --on--;
Line 14, "externally" should be deleted;
Line 15, "settings." should read --settings externally.--;
Line 20, "to be" should read --for being--;
Line 23, "to" (first occurrence) should read --on--;
Line 26, "later-described output unit." should read --output unit describe below.--;
Line 39, "to" should read --on--;
Line 46, "the" should read --an--;
Line 51, "later described" should read --described below--;
Line 58, "not-shown CPU" should read --CPU (not shown)--; and
Line 59, "not-shown storage means." should read --storage means (also not shown).--.

COLUMN 4

Line 17, "to" should read --on--;
Line 18, "to" should read --on--;
Line 21, "former image" should read --"former image",--;
Line 23, "to" should read --on--;
Line 26, "are" should read --is--;
Line 27, "are" should read --is--;
Line 28, "are" should read --is--;
Line 36, "not-shown CPU" should read --CPU (not shown)--;
Line 40, "referred. Here," should read --referred to;--
Line 41, "to" should read --with--;
Line 50, "color space map" should read --"color space map",--; and
Line 53, "as getting away" should read --with distance--.

COLUMN 5

Line 22, "whereby" should read --and thus--; and
Line 42, "he" should read --she--.

UNITED STATES PATENT AND TRADEMARK OFFICE
CERTIFICATE OF CORRECTION

PATENT NO. : 7,245,306 B2
APPLICATION NO. : 10/633036
DATED : July 17, 2007
INVENTOR(S) : Katsuhito Yoshio et al.

It is certified that error appears in the above-identified patent and that said Letters Patent is hereby corrected as shown below:

COLUMN 6

Line 24, "whereby" should read --and thus--;
    Line 25, "more certain" should read --more-certain--;
    Line 31, "more certain" should read --more-certain--;
    Line 36, "to the same (or other)" should read --on the same (or another)--;
    Line 44, "adjustment" (second occurrence) should read --user can set the adjustment--; and
    Line 46, "can be set in regard to each of" should read --in regard to each of the various--.

COLUMN 7

Line 11, "process" should read --processes--;
    Line 16, "standard" should read --a standard--; and
    Line 46, "with large." should read --large.--.

COLUMN 8

Line 10, "to more sensuously" should read --more sensuously to--;
    Line 13, "he" should read --she--;
    Line 14, "whereby it is possible to quickly" should read --and as a result it is possible quickly to--;
    Line 19, "whereby" should be deleted;
    Line 21, "a" (both occurrences) should read --the--;
    Line 38, "whereby" should read --and in this way--;
    Line 46, "resultingly" should read --resultantly--;
    Line 49, "update" should read --updating--;
    Line 53, "expression." should read --expressions.--;
    Line 65, "image," should read --image, the user may be notified of--;
    Line 66, "may be notified to the" should be deleted; and
    Line 67, "user" should be deleted.

COLUMN 9

Line 4, "By" should read --By virtue of--;
    Line 5, "following" should read --the following--;
    Line 6, "That is, according to the" should read --According to--;

UNITED STATES PATENT AND TRADEMARK OFFICE
CERTIFICATE OF CORRECTION

PATENT NO. : 7,245,306 B2 Page 4 of 4
APPLICATION NO. : 10/633036
DATED : July 17, 2007
INVENTOR(S) : Katsuhito Yoshio et al.

It is certified that error appears in the above-identified patent and that said Letters Patent is hereby corrected as shown below:

Line 14, "to" should read --on--;
    Line 15, "to more sensuously" should read --more sensuously to--;
    Line 19, "whereby" should read --and thus--;
    Line 20, "Besides, according to the" should read --According to--;
    Line 21, "the" (first occurrence) should be deleted;
    Line 31, "the" should be deleted;
    Line 34, "Besides, according to the" should read --According to--;
    Line 38, "whereby" should read --and thus--; and
    Line 43, "Besides, it" should read --It--.

COLUMN 10

Line 10, "Moreover," should read --Moreover, because--;
    Line 12, "to more easily" should read --more easily to--; and
    Line 58, "space;" should read --space; and--.

COLUMN 11

Line 4, "space;" should read --space; and--.

COLUMN 12

Line 4, "space;" should read --space; and--.

Signed and Sealed this

Fifteenth Day of April, 2008

JON W. DUDAS
*Director of the United States Patent and Trademark Office*